(12) United States Patent
Blessitt

(10) Patent No.: US 9,423,079 B1
(45) Date of Patent: Aug. 23, 2016

(54) METHOD AND SYSTEM FOR RETROFITTING LUMINAIRES

(71) Applicant: James Harvey Blessitt, Peachtree City, GA (US)

(72) Inventor: James Harvey Blessitt, Peachtree City, GA (US)

(73) Assignee: Cooper Technologies Company, Houston, TX (US)

(*) Notice: Subject to any disclaimer, the term of this patent is extended or adjusted under 35 U.S.C. 154(b) by 119 days.

(21) Appl. No.: 14/324,519

(22) Filed: Jul. 7, 2014

Related U.S. Application Data

(60) Provisional application No. 61/843,104, filed on Jul. 5, 2013, provisional application No. 62/004,783, filed on May 29, 2014.

(51) Int. Cl.
*F21K 99/00* (2016.01)
*F21V 29/00* (2015.01)

(52) U.S. Cl.
CPC . *F21K 9/175* (2013.01); *F21K 9/52* (2013.01); *F21K 9/90* (2013.01); *F21V 29/2206* (2013.01)

(58) Field of Classification Search
CPC ............. F21K 9/175; F21K 9/90; F21K 9/52
See application file for complete search history.

(56) References Cited

U.S. PATENT DOCUMENTS

| | | |
|---|---|---|
| 4,622,624 A | 11/1986 | McCarthy et al. |
| D305,943 S | 2/1990 | Ossip-Klein |
| D374,301 S | 10/1996 | Kleffman |
| D544,993 S | 6/2007 | Mayfield et al. |
| D577,857 S | 9/2008 | Tress et al. |
| D606,227 S | 12/2009 | Erickson et al. |
| D608,490 S | 1/2010 | Chung et al. |
| D608,932 S | 1/2010 | Castelli |
| D698,973 S | 2/2014 | Santoro et al. |
| 2013/0039050 A1* | 2/2013 | Dau ................... G02B 6/0045 362/218 |
| 2013/0234600 A1* | 9/2013 | Park ..................... H05B 33/08 315/122 |
| 2014/0268765 A1 | 9/2014 | Sieberth et al. |

* cited by examiner

*Primary Examiner* — Anne Hines
(74) *Attorney, Agent, or Firm* — King & Spalding LLP

(57) ABSTRACT

A lighting fixture can be upgraded from utilizing a fluorescent-based light source to utilizing a light source based on light emitting diode (LED) technology. The upgrade can be completed while the fixture is mounted at an installation, or the fixture can be taken down temporarily during the upgrade. One or more fluorescent tubes in the fixture can be removed and replaced with an LED-based light engine. The light engine can include LEDs, an LED driver, and a lightguide, which may be slab-shaped. The LEDs can couple light into the lightguide, and the lightguide can distribute the coupled light. A bracket system can mount the new light engine to a frame of the lighting fixture. If the lighting fixture has a ballast, the ballast can remain attached to the fixture frame during and after the upgrade or be removed, for example.

20 Claims, 12 Drawing Sheets

METHOD AND SYSTEM FOR RETROFITTING LUMINAIRES

CROSS REFERENCE TO RELATED APPLICATIONS

This application claims priority to U.S. Provisional Patent Application No. 62/004,783, filed May 29, 2014 in the name of James Harvey Blessitt and entitled "Retrofitting Luminaires to Incorporate Edgelit Optics," and further claims priority to U.S. Provisional Patent Application No. 61/843,104, filed Jul. 5, 2013 in the name of James Blessitt and entitled "Retrofitting Luminaires to Incorporate Edgelit Optics." The entire contents of both of the above-identified priority documents (U.S. Provisional Patent Application Nos. 62/004,783 and 61/843,104,) are hereby incorporated herein by reference.

TECHNICAL FIELD

The present technology relates generally to lighting fixtures. More specifically, the technology relates to a method and a kit for upgrading fluorescent lighting fixtures to incorporate lightguides and light emitting diodes.

BACKGROUND

A substantial installed base of luminaires or lighting fixtures utilizes fluorescent light sources. Many such fixtures incorporate fluorescent tubes for overhead lighting, including recessed lighting fixtures in drop-in ceilings and fixtures that are suspended via chain, for example. Replacing such existing fixtures with lighting systems based on light emitting diode (LED) technology would reduce energy consumption and improve light quality. However, wholesale fixture replacement would result in capital costs, labor, and disposal issues.

Accordingly, there are needs in the art for capabilities to upgrade installed lighting fixtures for enhanced performance or operational efficiency, including with light emitting diode technology. A technology addressing such a need, or some related deficiency in the art, would result in benefits that may include improved lighting economics and light quality.

SUMMARY

A fluorescent lighting fixture or luminaire can be upgraded or retrofitted to utilize light emitting diode technology.

In one aspect of the disclosure, a fluorescent lighting fixture to be upgraded can incorporate one or more florescent tubes and an electrical system that may include a ballast. The fluorescent tubes can be removed from the lighting fixture and replaced with a light engine that utilizes light emitting diode technology. The removal and replacement may be conducted while the lighting fixture is mounted to a structure, or the lighting fixture may be temporarily removed from the structure during the upgrade. The light engine can comprise a row of light emitting diodes, a lightguide, and an electrical power system. One or more brackets can mount the new light engine to an existing frame of the lighting fixture. The ballast can remain attached to the lighting fixture during and after the retrofit or be removed, for example.

The foregoing discussion of retrofitting lighting systems is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
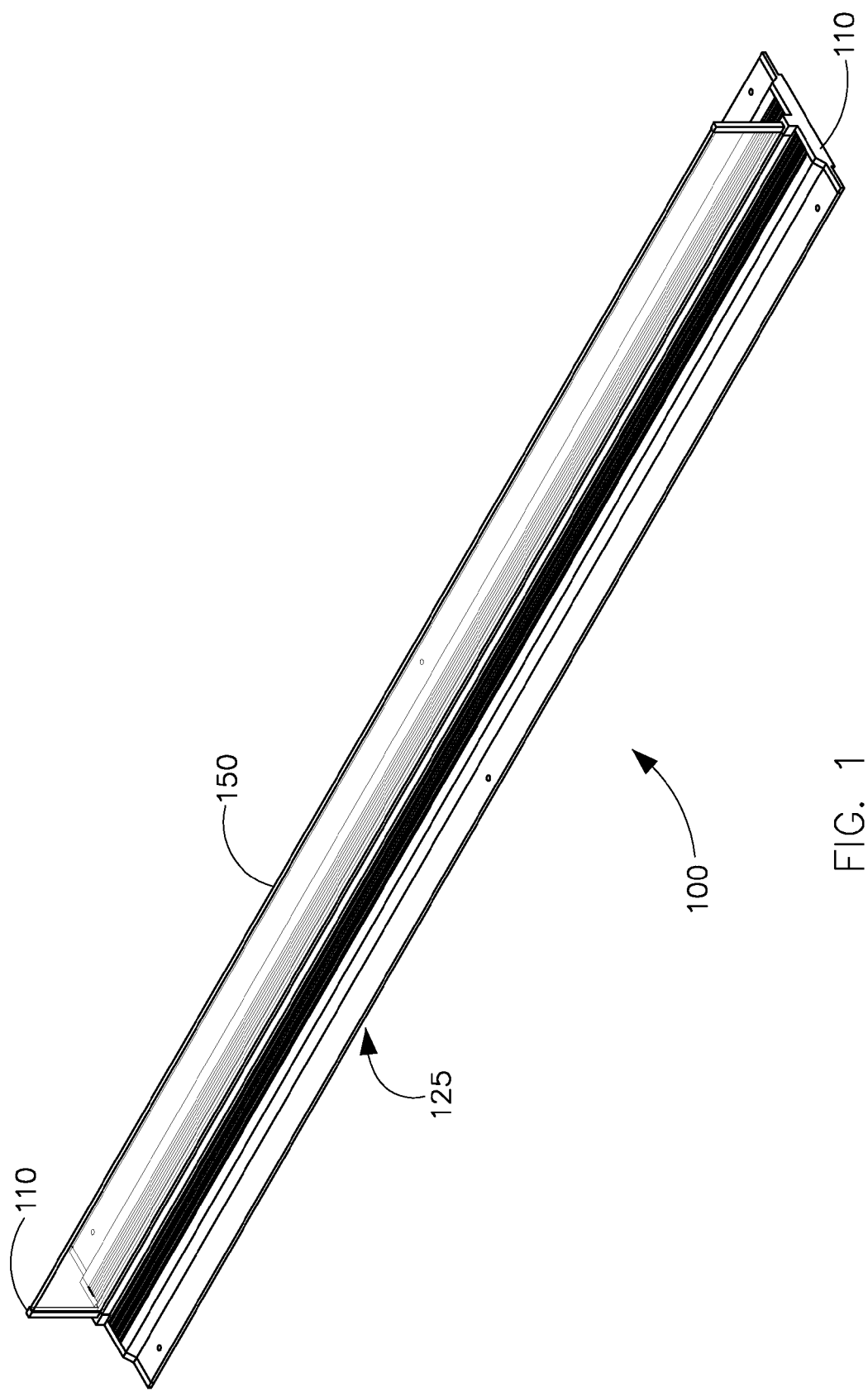
FIG. 1 is a perspective view of a kit for retrofitting a lighting fixture to incorporate light emitting diode technology and a lightguide in accordance with an example embodiment of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

Some example embodiments of the present technology support retrofitting lighting fixtures for enhanced efficiency or improved performance, for example by utilizing light emitting diode technology.

However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may need to naturally precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Figure 4:
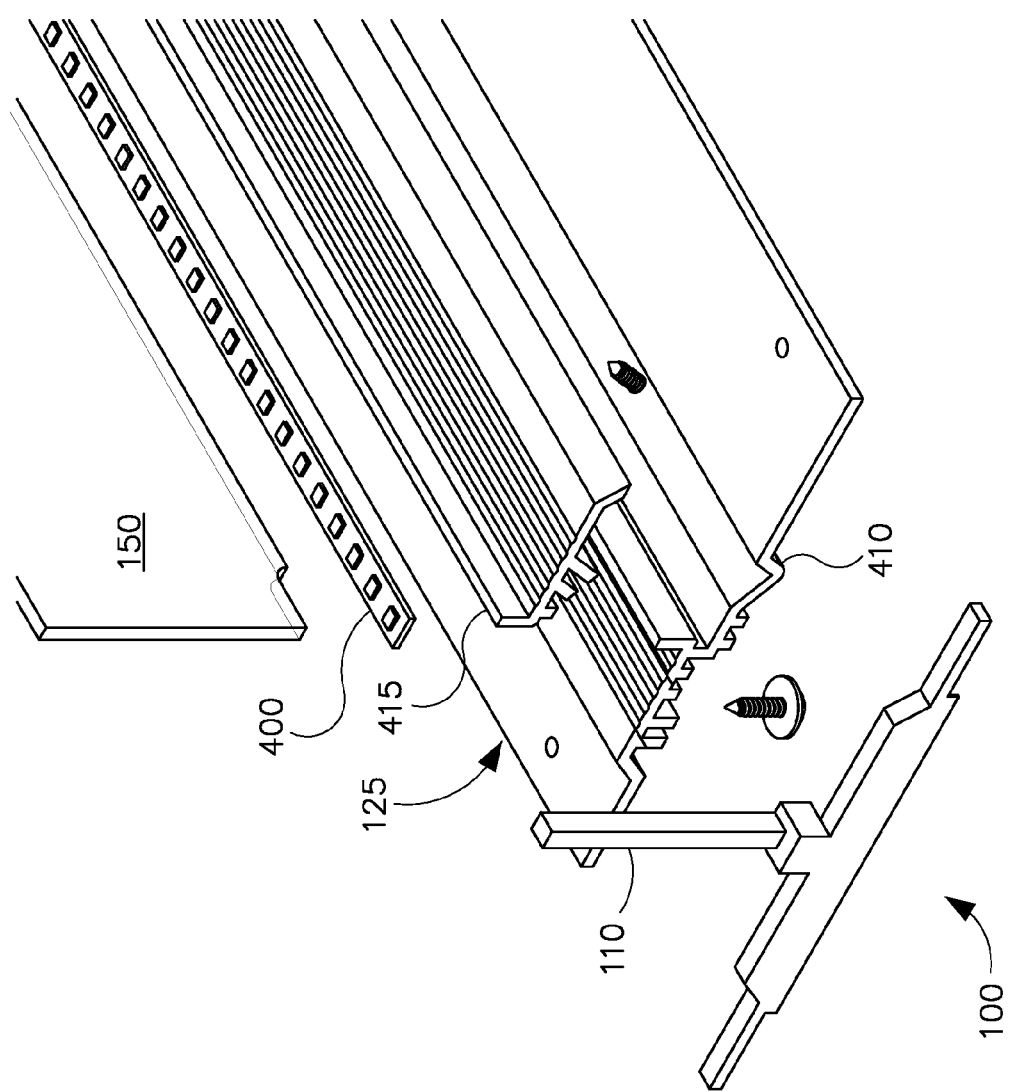
FIG. 4 is an exploded view of the end of the retrofit kit illustrated in FIG. 1 in accordance with an example embodiment of the present technology.
Figure 5:
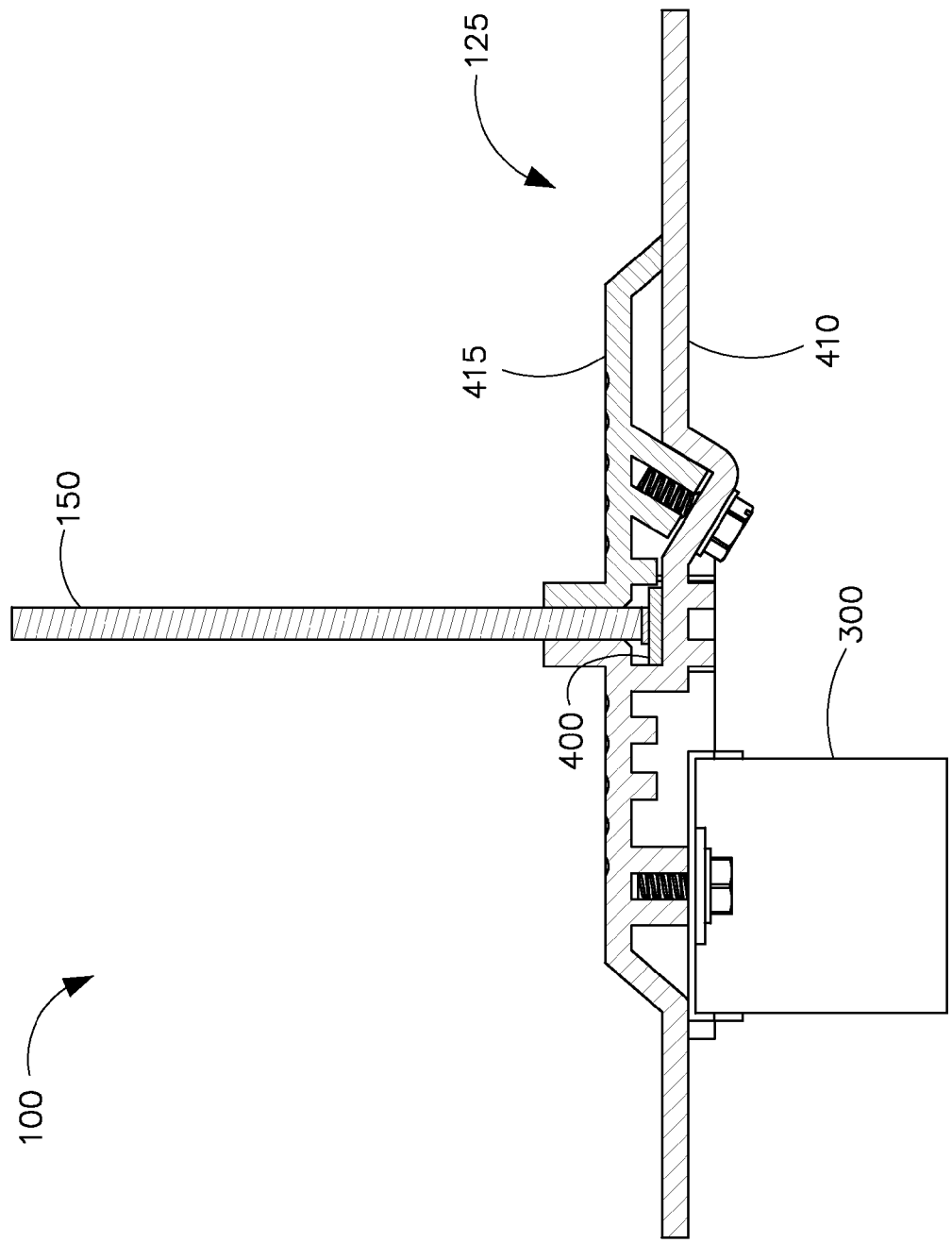
FIG. 5 is a cross section view of the end of the retrofit kit illustrated in FIG. 1 in accordance with an example embodiment of the present technology.
Figure 6:
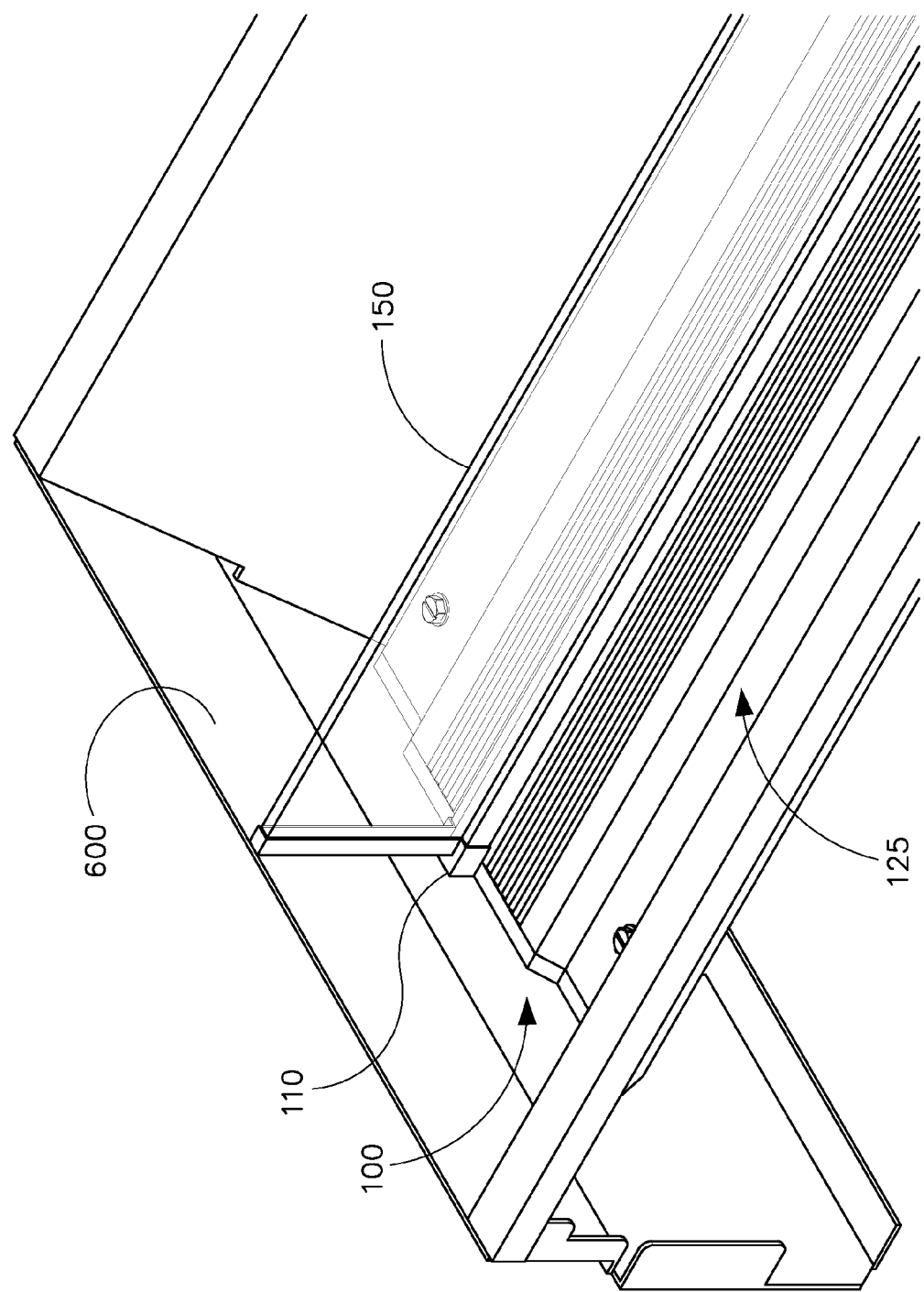
FIG. 6 is a perspective view of an end of a lighting fixture that has been upgraded using the retrofit kit illustrated in FIG. 1 in accordance with an example embodiment of the present technology.
Figure 7:
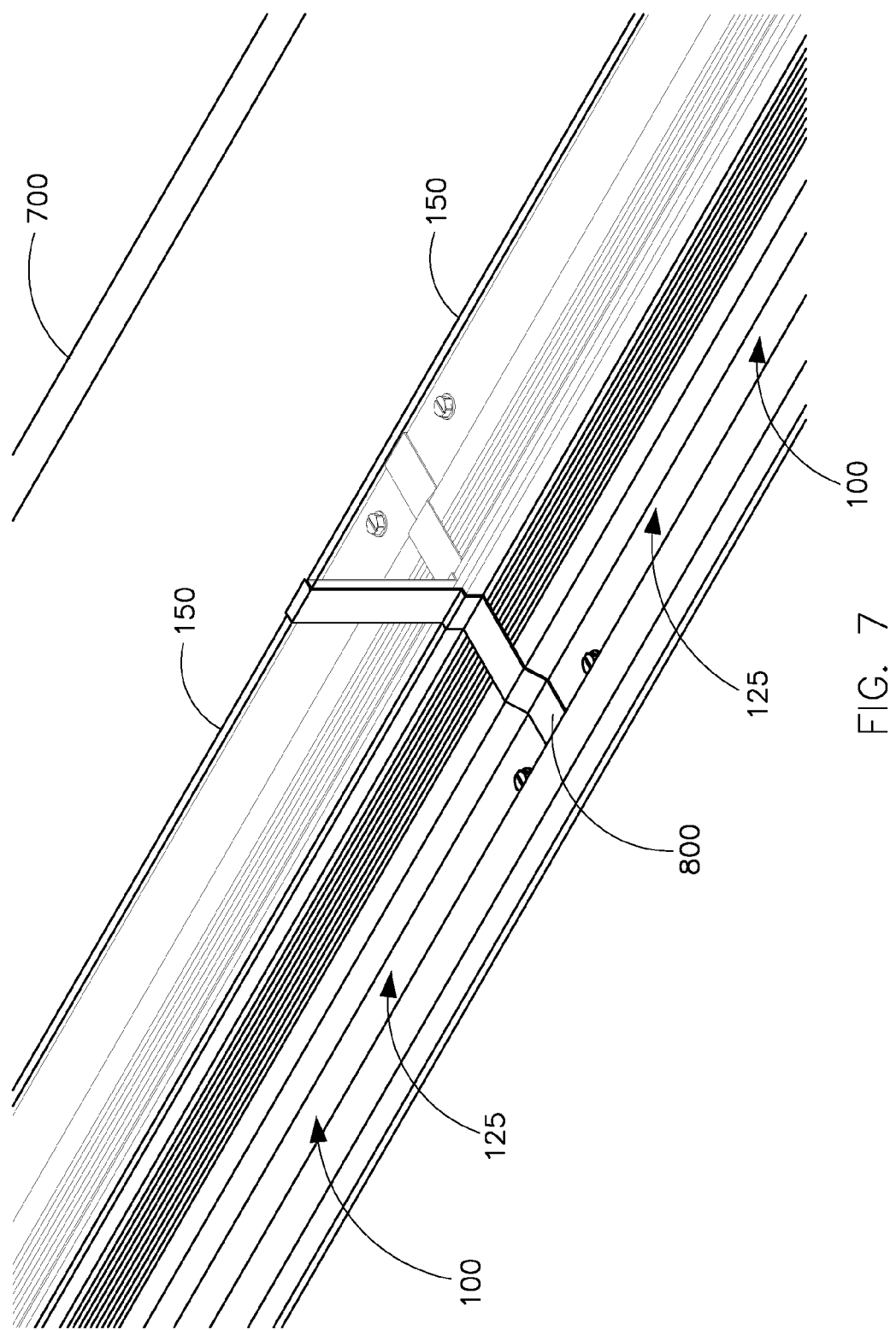
FIG. 7 is a perspective view of a central portion of a long lighting fixture that has been upgraded using two of the retrofit kits illustrated in FIG. 1 in accordance with an example embodiment of the present technology.
Figure 8:
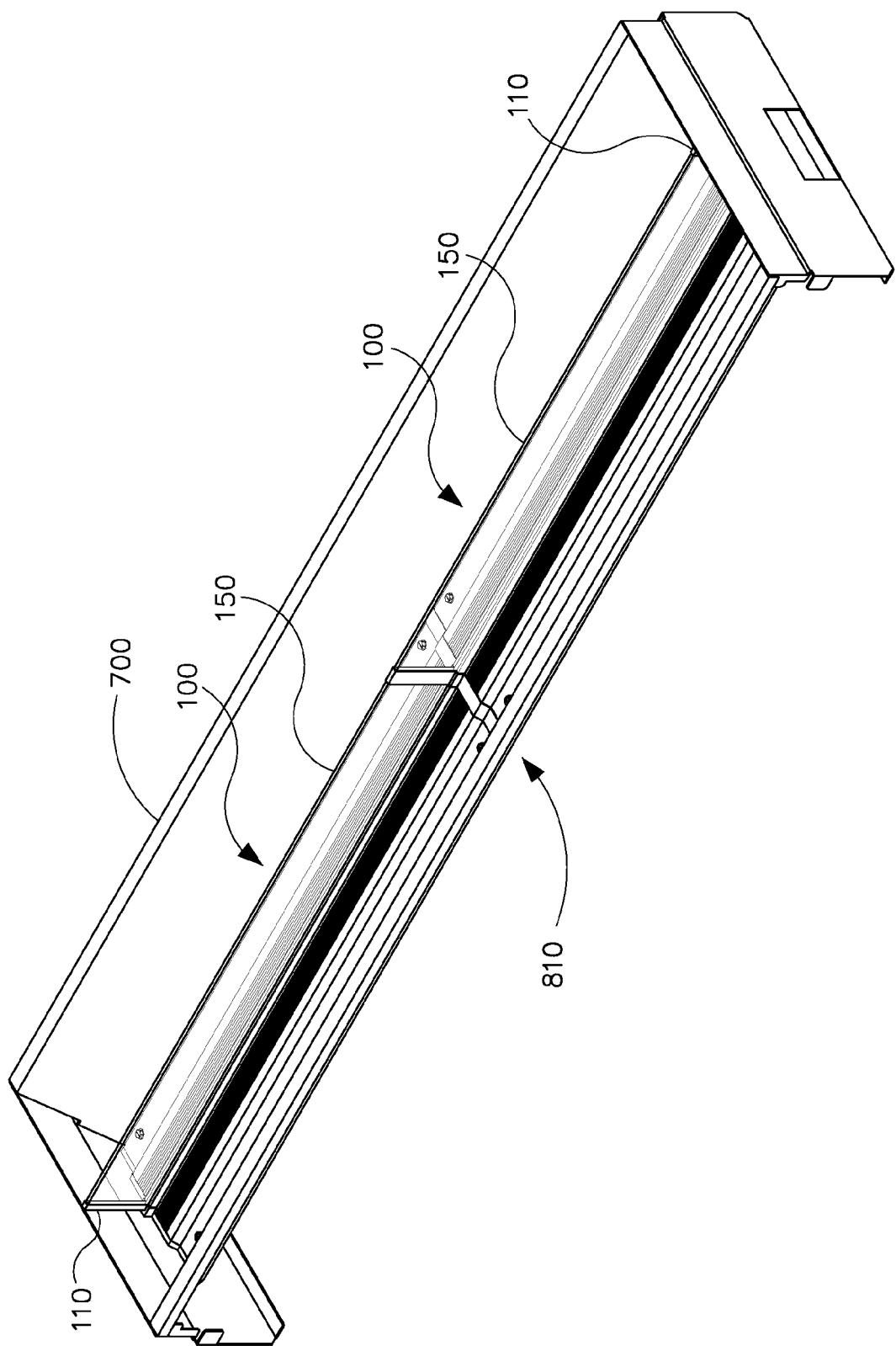
FIG. 8 is a perspective view of the long lighting fixture illustrated in FIG. 7 that has been upgraded using two retrofit kits in accordance with an example embodiment of the present technology.
Figure 9:
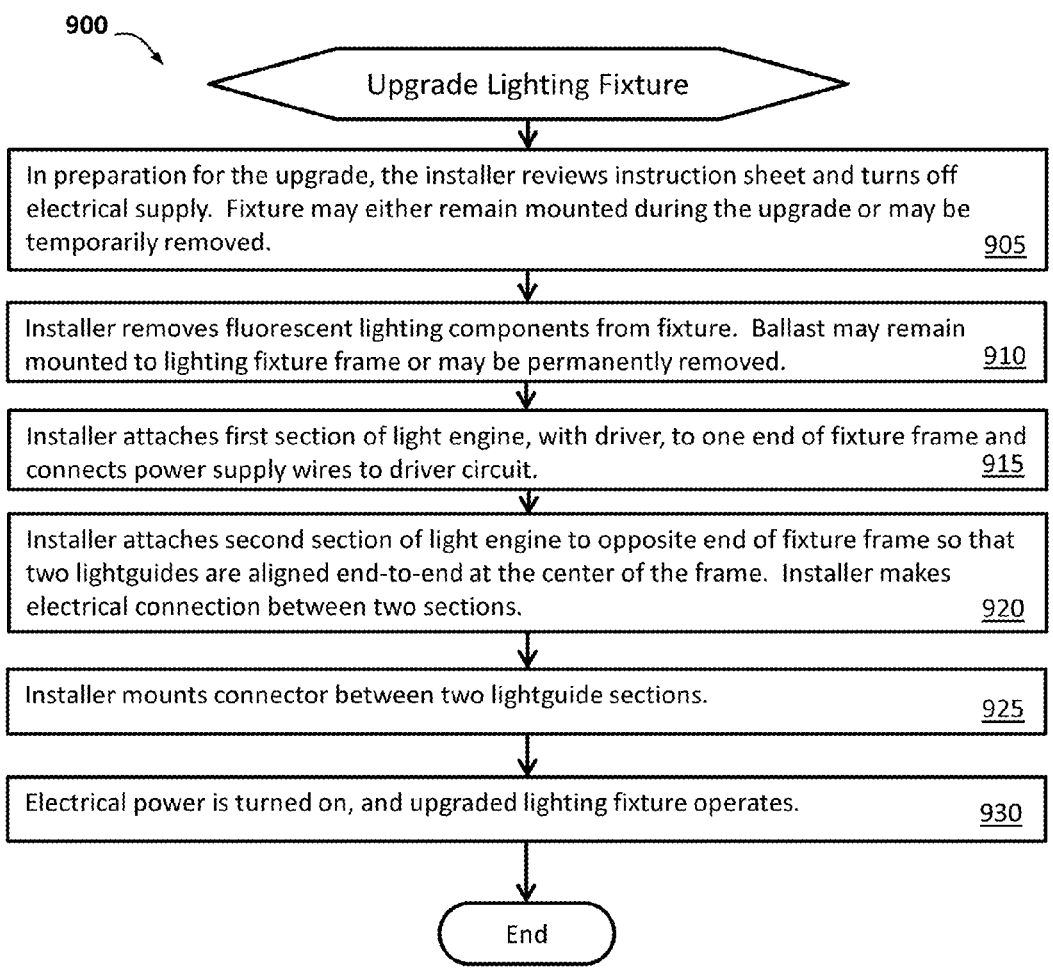
FIG. 9 is a flowchart of a process for retrofitting lighting fixtures to incorporate light emitting diode technology in accordance with an example embodiment of the present technology.
Figure 10:
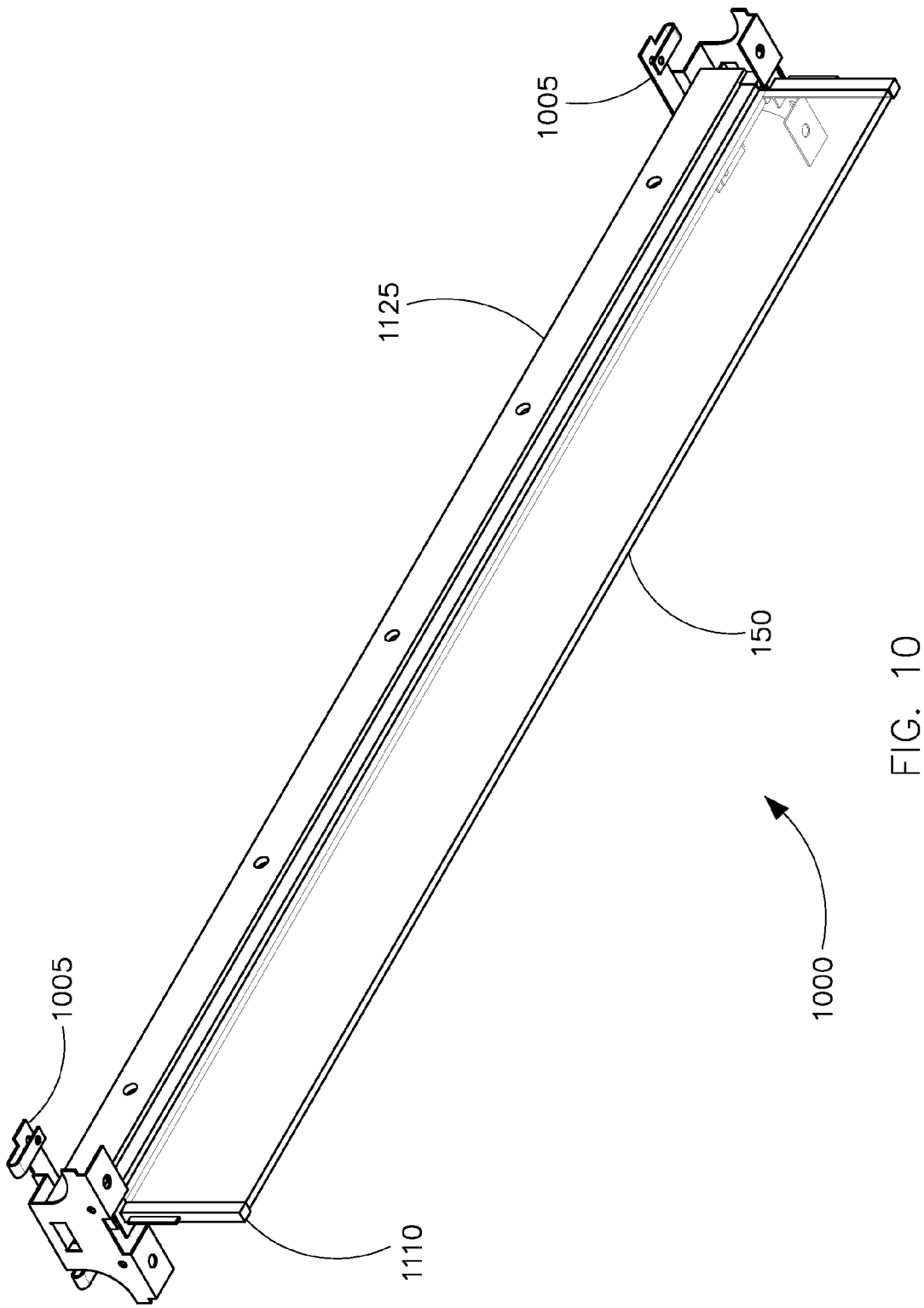
FIG. 10 is a perspective view of another kit for retrofitting a lighting fixture to incorporate light emitting diode technology and edgelit blade optics in accordance with an example embodiment of the present technology.
Figure 11:
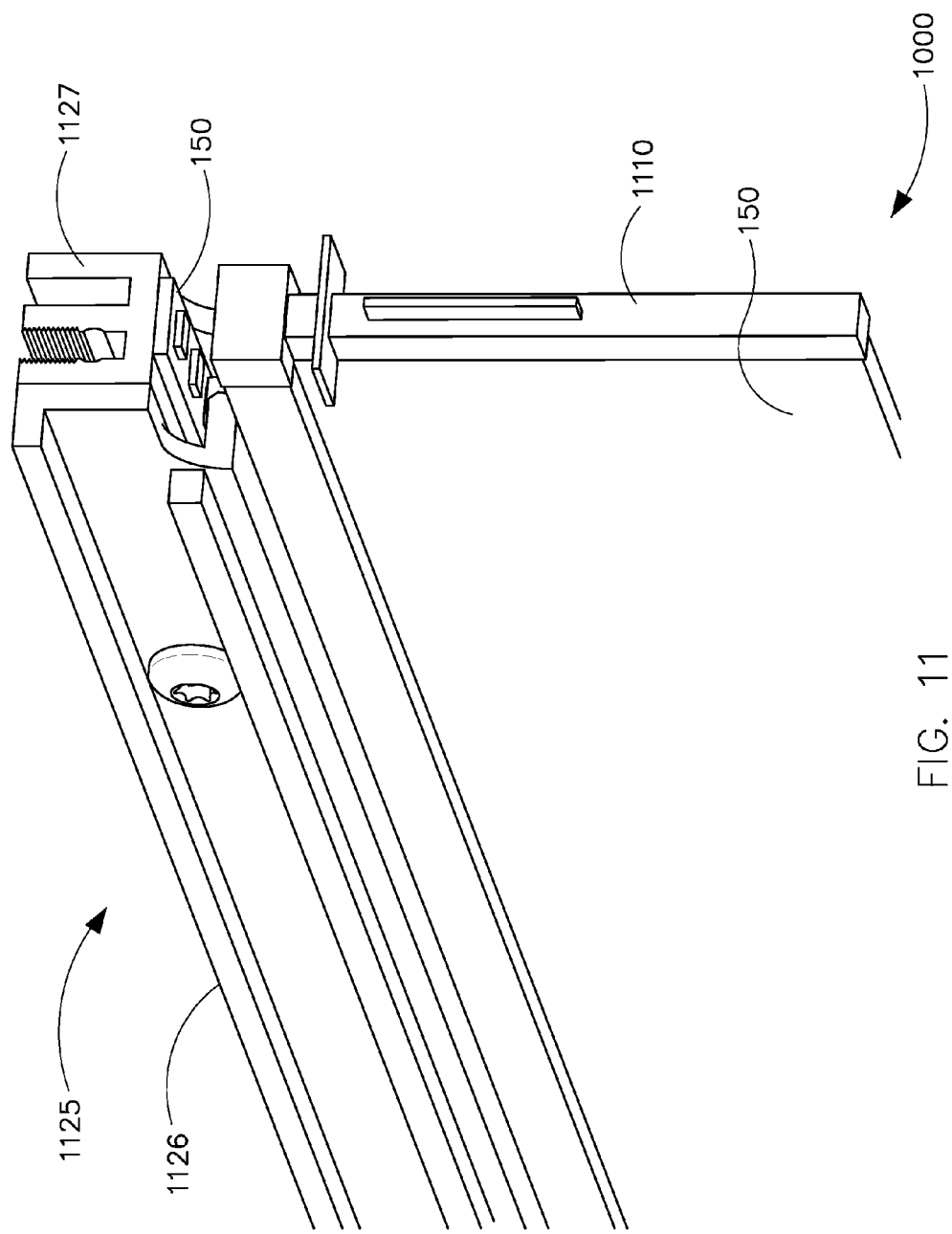
FIG. 11 is a magnified perspective view of the retrofit kit illustrated in FIG. 10, detailing one end, in accordance with an example embodiment of the present technology.
Figure 12:
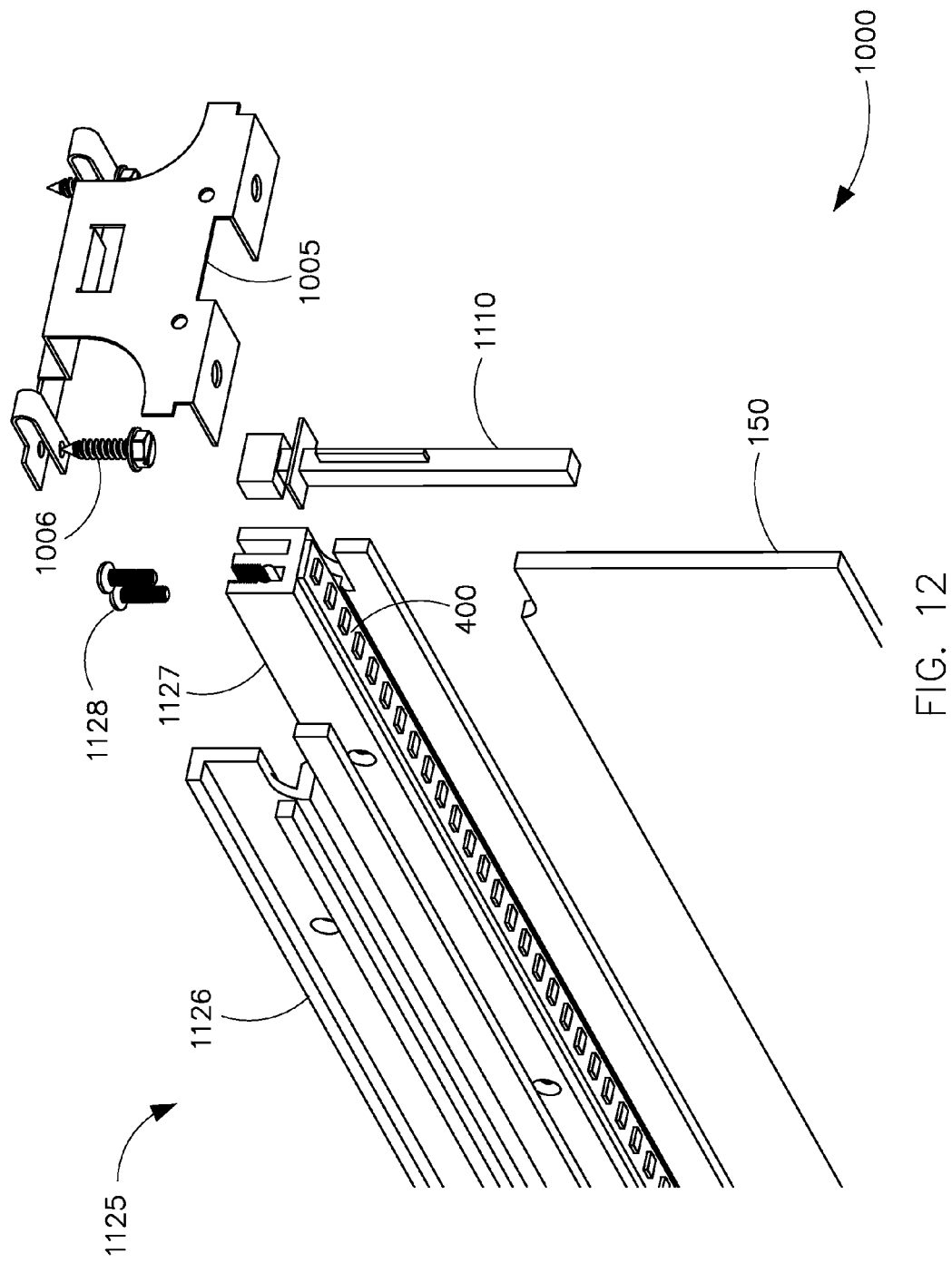
FIG. 12 is an exploded view of the end of the retrofit kit illustrated in FIGS. 10 and 11 in accordance with an example embodiment of the present technology.

Technology for upgrading or retrofitting lighting systems will now be described more fully with reference to FIGS. 1-12, which describe representative embodiments of the present technology. FIGS. 1-5 illustrate a representative retrofit kit. FIG. 6 illustrates a short lighting fixture as upgraded by the retrofit kit. FIGS. 7 and 8 illustrate a long lighting fixture as upgraded by two of the retrofit kits. FIG. 9 illustrates, in flowchart form, a retrofit process. FIGS. 10-12 illustrate another representative retrofit kit.

Turning now to FIGS. 1, 2, 3, 4, and 5, these figures illustrate an example kit 100 for retrofitting a lighting fixture to incorporate light emitting diode technology and one or more lightguide 150 according to some embodiments of the present technology.

Figure 2:
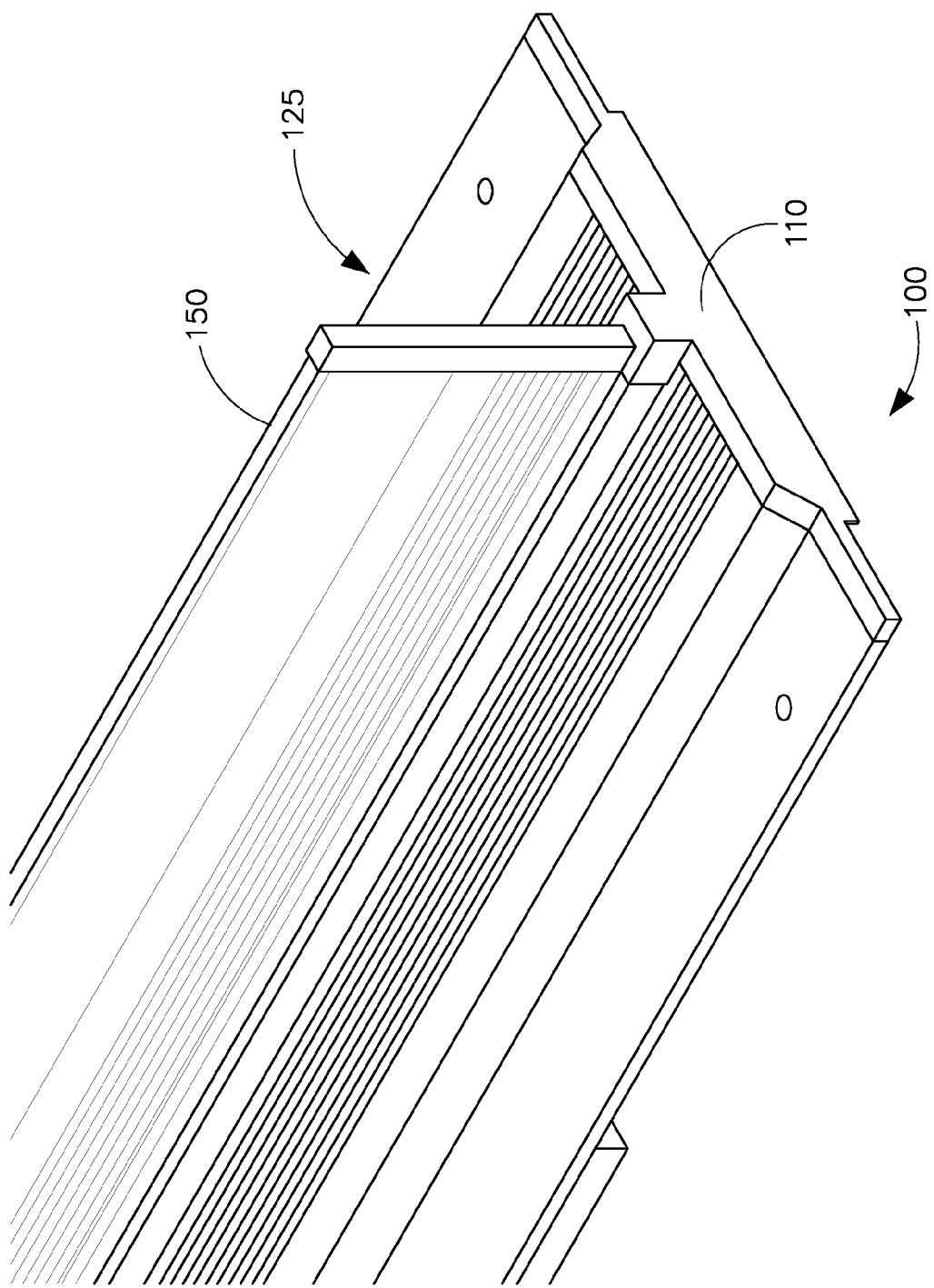
FIG. 2 is a magnified perspective view of the retrofit kit illustrated in FIG. 1, detailing an end and showing the lightguide side, in accordance with an example embodiment of the present technology.
Figure 3:
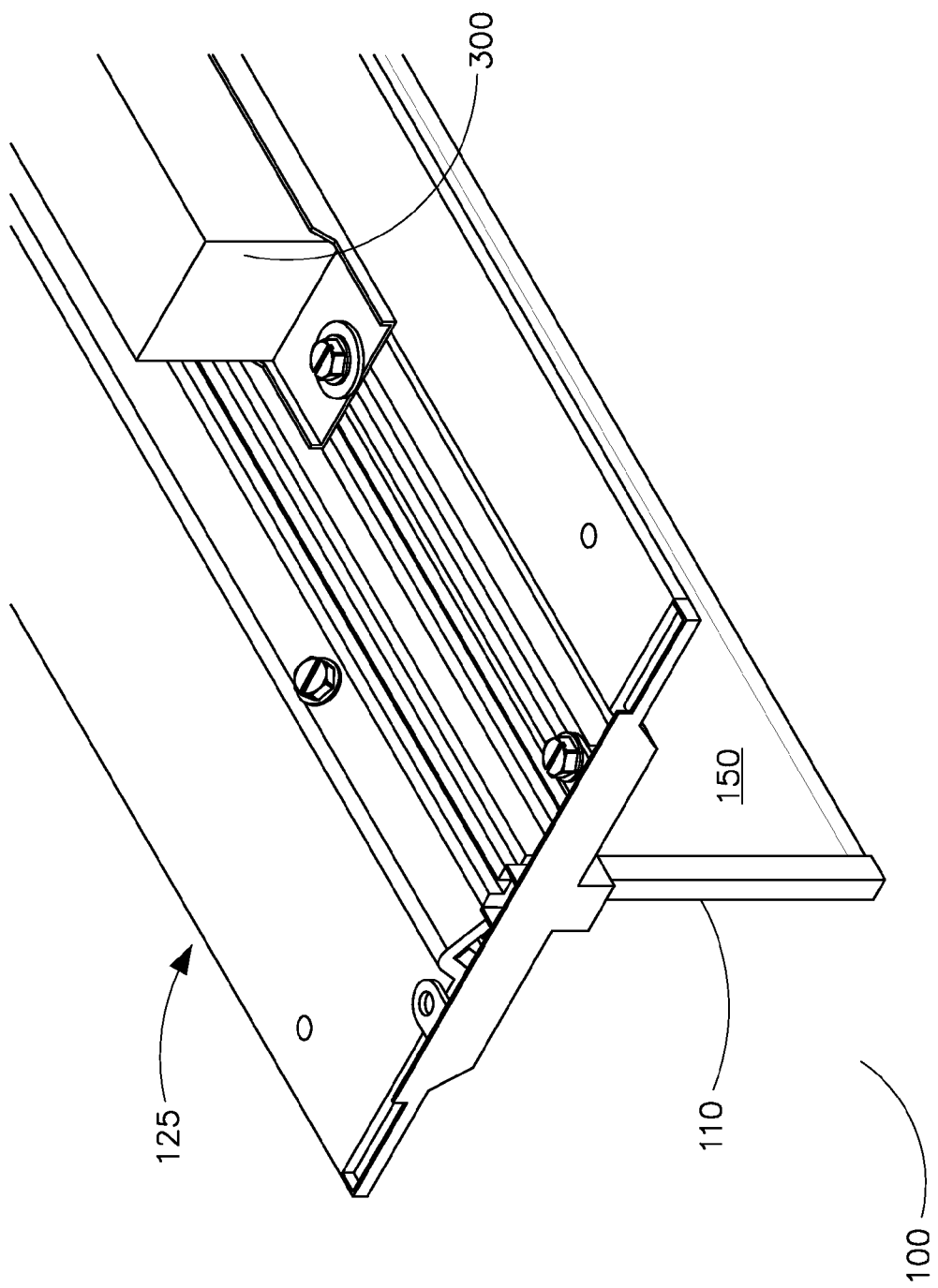
FIG. 3 is a magnified perspective view of the retrofit kit illustrated in FIG. 1, further detailing the end and showing the underside, in accordance with an example embodiment of the present technology.

FIG. 1 illustrates a perspective view of the retrofit kit. FIG. 2 illustrates a magnified perspective view of the retrofit kit 100, detailing the lightguide side of an end of the kit 100. FIG. 3 illustrates a magnified perspective view of the retrofit kit 100, detailing an underside of the end. FIG. 4 illustrates an exploded view of the retrofit kit end. FIG. 5 illustrates a cross section view of the end of the retrofit kit 100. Thus, FIGS. 2, 3, 4, and 5 provide magnified views of an end of the retrofit kit 100 shown initially in FIG. 1.

The retrofit kit 100 comprises a light engine that can be installed in a fluorescent lighting fixture to upgrade the fixture to light emitting diode technology. As will be discussed in further detail below with reference to FIGS. 6, 7, 8, and 9, the retrofit kit 100 is suitable for upgrading lighting fixtures of various lengths, including short and long lighting fixtures. The kit 100 can be installed in a four-foot long fluorescent lighting fixture while the fixture remains installed. Two of the kits 100 can be utilized for upgrading an eight-foot long fluorescent lighting fixture, for example with the fixture remaining installed or temporarily taken down. The fluorescent bulb or bulbs can be removed, along with some or all of the associated wiring, and replaced with the light engine.

In the illustrated embodiment of FIGS. 1-5, the retrofit kit 100 comprises a lightguide 150 in the form of an edgelit blade optic. As illustrated, the lightguide 150 can be formed from or comprise a slab or strip of optical material. Additional details about representative embodiments of the illustrated light engine, the lightguide/edgelit blade optics, and the light emitting diode technology are provided in U.S. patent application Ser. No. 13/836,853, filed Mar. 15, 2013 in the name of James H. Blessitt and Paul W. Lewis and entitled "Edgelit LED Blade Fixture." The entire contents of U.S. patent application Ser. No. 13/836,853 are hereby incorporated herein by reference.

As illustrated, the kit 100 comprises the lightguide 150, two end caps 110, a heat sink/printed circuit board (PCB) assembly 125, and a driver 300. The heat sink/printed circuit board assembly 125 comprises a heat sink base 410, a heat sink clamp 415, and a printed circuit board assembly 400.

As illustrated in FIG. 5, when assembled, the heat sink base 410 and the heat sink clamp 415 form a channel in which an edge of the lightguide 150 is seated. In some embodiments, the heat sink base 410 and heat sink clamp 415 can urge or clamp together to support or to embrace the edge of the lightguide 150.

As illustrated, the heat sink base 410 and the heat sink clamp 415 have longitudinally extending fins. In various embodiments, the shape or profile of the base 410 and clamp 415 may vary according to application parameters and user preference. For example, in some high-lumen applications, the fins may be larger, thinner, deeper, or more numerous. In other applications, aesthetics may weigh more heavily than thermal performance. In some embodiments, heat sink features may extend laterally, crosswise, diagonally, or in some other appropriate pattern or direction. In some embodiments, the fins may be broken rather than continuous or may be formed in some other appropriate geometry.

As illustrated in FIGS. 4 and 5, the printed circuit board assembly 400 is mounted adjacent the lightguide edge. In this configuration, light emitting diodes couple light into the edge of the lightguide 150. The lightguide 150 emits and distributes the coupled light to provide illumination.

The end caps 110 are disposed at opposing ends of the lightguide 150, providing further mounting support. Additionally, the end caps 110 can provide an optical function, such as to manage light emitted from or incident upon the ends of the lightguide 150.

In some embodiments, the end caps 110 are formed from white plastic that diffusely reflects the emitted light back into the lightguide 150. In some embodiments, the end caps 110 are metallized to reflect the emitted light back into the lightguide 150. The end caps 110 can be made from plastic to which a metal film is applied or can be formed from shiny or roughened metal, for example. In some embodiments, the end caps 110 are clear. In some embodiments, the end caps 110 transmit and diffuse light emitted from the ends of the lightguides 150. In some embodiments, the end caps 110 are made from a clear plastic material with a surface that is patterned, textured, or otherwise treated to diffuse light. In some embodiments, the end caps 110 are made of colored plastic that is translucent, clear, or opaque.

Turning now to FIG. 6, this figure illustrates a perspective view of an end of an example four-foot long fluorescent lighting fixture 600 that has been upgraded using the retrofit kit 100 illustrated in FIGS. 1, 2, 3, 4 and 5 according to some embodiments of the present technology. The retrofit kit 100 provides a four-foot long light engine that replaces the four-foot long fluorescent tubes of a pre-upgraded lighting fixture, which in the embodiment of FIG. 6 is designed for overhead lighting.

As will be discussed in further detail below with reference to the process flowchart illustrated in FIG. 9, the retrofit kit 100 is fastened to the frame of the lighting fixture 600 and extends lengthwise. The resulting light engine can provide a similar (or improved) distribution pattern of light as provided with the fluorescent bulbs, but at lower cost and with improved color content. Furthermore, the upgraded lighting fixture 600 supports dimmable controls.

Turning now to FIGS. 7 and 8, these figures illustrate an example eight-foot long fluorescent lighting fixture 700 that has been retrofitted using two of the retrofit kits 100 illustrated in FIGS. 1, 2, 3, 4, and 5 according to some embodiments of the present technology. FIG. 7 illustrates a perspective view of a central portion of the retrofitted lighting fixture 700, and FIG. 8 illustrates a perspective view of the retrofitted lighting fixture 700.

In the illustrated embodiment, two lightguides 150 are placed end-to-end to extend the full length of the eight-foot long lighting fixture 700. A connector 810 is positioned at the junction between two four-foot lightguides 150 to join the two lightguides 150 together. The connector 810 can comprise a clear acrylic connector, for example. FIG. 7 details the end-to-end coupling between the two lightguides 150, specifically utilizing a clear acrylic embodiment of the connector 810.

The connector 810 can provide an optical function, a mechanical function, or a combined optical and mechanical function. In some embodiments, light can couple between the two lightguides 150 via the connector 810. For example, at least some light transmitting lengthwise along one of the lightguides 150 can emit out of the end of that lightguide 150 and into the other lightguide 150 via the connector 810. In some embodiments, the light coupled flows through the connector 810. In some embodiments, the connector 810 aligns the lightguides 150 so that the lightguides 150 contact one another or so that an air gap exists between the two lightguides 150.

In some embodiments, the connector 810 is formed from white plastic that diffusely reflects emitted light back into the lightguides 150. In some embodiments, the connector 810 is metallized to reflect end-emitted light back into the lightguides 150. In some embodiments, the connector 810 is made of clear plastic that is colored. In some embodiments, the connector 810 transmits and diffuses light emitted from the adjoining ends of the lightguides 150. In some embodiments, the connector 810 is made from a clear plastic material with a surface that is patterned, textured, or otherwise treated to diffuse light. In some embodiments, the connector 810 is translucent, clear, or opaque.

Turning now to FIG. 9, this figure illustrates a flowchart of an example process 900 for retrofitting a lighting fixture 600, 700 to incorporate light emitting diode technology according to some embodiments of the present technology. The process 900 will be largely discussed with example reference to upgrading the eight-foot long lighting fixture 700 using two retrofit kits 100 as illustrated in FIGS. 7 and 8 and discussed above. Such reference is without limitation, as a wide variety of other lighting fixture upgrades are supported.

At block 905 of process 900, which is entitled Upgrade Lighting Fixture, preparations are made for the retrofit, which may be conducted by an installer, such as one or more people. The installer reviews retrofit instructions, which may be printed on paper or otherwise provided. A writing may comprise such instructions, and further may comprise any appropriate portions of the present description of process 900 or other elements of the disclosure provided herein. The installer turns off power to the electrical circuit that supplies utility power to the lighting fixture 700. In some embodiments, the lighting fixture 700 remains mounted, for example to a ceiling or other structure, during the retrofit. Alternatively, the fixture 700 may be temporarily removed.

At block 910, the installer disconnects or cuts power leads from the ballast of the fluorescent lighting fixture 700; removes and discard the fluorescent lamps, channel cover, socket tracks, and center bridge; and cuts and removes ballast wiring including sockets. With the retrofit kit 100, the ballast can be left in place. Thus, the procedure can be completed without removal of the ballast, thereby reducing labor and disposal. Alternatively, the ballast can be removed and discarded.

At block 915 of process 900, the installer attaches the first retrofit kit 100 to the lighting fixture 700, so as to provide an LED-based light engine, which may include an LED driver 300 as illustrated in FIG. 5.

The kit installation can proceed with the installer orienting a first four-foot light engine section to one end of the lighting fixture channel, against the channel endplate. That end of the lightguide 150 has an end cap 110. When the lightguide 150 is so oriented, the end cap 110 is situated adjacent the end of the lighting fixture 700. In other words, each kit 100 can be supplied with an end cap 110 on one end of the lightguide 100, with the end cap 110 to be located to at an end of the fixture's eight-foot channel. While holding the lightguide 150 in position, the installer can use a cordless driver to attach a safety lanyard to the lighting fixture channel using a self-drilling screw, which may be provided with the kit 100.

In an example embodiment, the installer rotates the first four-foot section of lightguide 150 against the fixture channel and endplate while centering from side-to-side in the channel. The installer may confirm that wires are not pinched between the kit 100 and the lighting fixture frame. Self-drilling screws hold the assembly together.

Also at block 915, the installer connects power supply wiring to the LED driver 300. In some example embodiments, a single LED driver 300 can drive two light engines. In this situation, the kit 100 with the driver 300 may be installed first, as is the current example.

In some embodiments, the installer may connect incoming power supply wires to appropriate ports on a supplied disconnect by pushing stripped wire ends into the disconnect ports, while maintaining color-coding. In some other embodiments, wiring splices or nuts may be utilized. Line electrical wiring is thus provided to the kit 100 for receipt of utility power.

At block 920 of process 900, the installer locates the second four-foot section of lightguide 150 in the same manner as the first section, as discussed above. The installer may attach wiring harness connectors together to provide low voltage drive current to the second section. Thus, one LED driver 300 can be wired to drive two kits 100.

The installer positions the ends of the lightguides 150 that do not have end caps 110 adjacent one another, for example so that the ends are essentially butted together at the center of the lighting fixture 700. A small gap may exist between the two lightguides 150. The second kit 100 is secured in place using self-drilling screws, which may be provided with the kit 100. The installer may now remove protective film from the lightguides 150.

At block 925, the installer installs the connector 810 at the interface between the lightguides 150. In an example embodiment, the connector 810 snaps into place over the heat sink base 410.

At block 930, the retrofitted fixture 700 can be turned on and operated to provide LED-based lighting. Thus, the retrofit is complete.

Turning now to FIGS. 10, 11, and 12, these figures illustrate another example kit 1000 for retrofitting lighting fixtures to incorporate light emitting diode technology according to some embodiments of the present technology. FIG. 10 illustrates a perspective view of the retrofit kit 1000. FIG. 11 illustrates a magnified perspective view of one end of the retrofit kit 1000. FIG. 12 illustrates an exploded view of the end of the retrofit kit 1000.

As illustrated, the retrofit kit 1000 is sized to fit in a short, standard length lighting fixture but may be combined with one or more other kits 1000 to provide additional length for retrofitting longer lighting fixtures.

The retrofit kit 1000 comprises a lightguide 150, a heat sink assembly 1125, a printed circuit board assembly 400, two mounting brackets 1005, and two end caps 1110. For retrofitting longer lighting fixtures utilizing two kits 1000, only one of the end caps 1110 is typically deployed from each kit 1000. In this scenario, two lightguides 150 (one from each kit) can be coupled together as discussed above with reference to the kit 100 illustrated in the prior figures.

The heat sink assembly 1125 comprises a heat sink base 1127 and a heat sink strip 1126 that form a channel when fastened together. An edge of the lightguide 150 extends in that channel. As illustrated, the heat sink base 1127 and the heat sink strip 1126 have heat sink fins that extend lengthwise and dissipate heat generated in connection with the light emitting diodes and associated circuitry converting electrical energy into light.

The printed circuit board assembly 400 with light emitting diodes is mounted between the heat sink base 1127 and the edge of the lightguide 150. In this orientation, light emits into the edge of the lightguide 150, and the lightguide 150 distributes the emitted light to provide illumination.

Mounting brackets 1005 at opposing ends of the lightguide 150 mount the light engine to the lighting fixture via fasteners 1006, for example self-drilling screws. Bracket attachment fasteners 1128, for example screws, attach the printed circuit board assembly 400 (and the lightguide 150 and associated elements) to the mounting brackets 1005.

Similar to the retrofit kit 100, the retrofit kit 1000 can be deployed while the lighting fixture remains installed. The lighting fixture may be a four-foot long fluorescent lighting fixture or an eight-foot long fluorescent lighting fixture, for example. As discussed above with reference to process 900, the fluorescent bulbs are removed and replaced with the LED-based light engine provided by the kit 1000.

Technology for retrofitting luminaires has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A method for retrofitting a lighting fixture, comprising the steps of:
   removing a fluorescent tube from the lighting fixture; and
   mounting a power supply, one or more light emitting diodes, and a lightguide to the lighting fixture,
   wherein the mounted one or more light emitting diodes is oriented to couple light into an edge of the mounted lightguide,
   wherein the mounted lightguide is oriented to provide illumination by emitting the coupled light,
   wherein the mounted power supply is electrically coupled to the mounted one or more light emitting diodes,
   wherein prior to removal of the fluorescent tube, the fluorescent tube occupies a space in the installed lighting fixture, and
   wherein the mounted lightguide is disposed adjacent or in the space.

2. The method of claim 1, wherein the lighting fixture comprises a ballast, and
   wherein the mounting step comprises mounting the power supply, the one or more light emitting diodes, and the lightguide to the lighting fixture while the ballast is mounted to the lighting fixture.

3. The method of claim 1, wherein the lighting fixture comprises a mounted ballast, and
   wherein the retrofitted lighting fixture comprises the mounted ballast.

4. The method of claim 1, wherein the mounting step further comprises mounting two heat sink members to the lighting fixture, each extending lengthwise, and
   wherein the mounted lightguide extends lengthwise in a channel formed between the two mounted heat sink members.

5. The method of claim 1, wherein the lighting fixture is installed at a site prior to the removing and mounting steps,
   wherein the lighting fixture is installed at the site during the removing and mounting steps, and
   wherein the lighting fixture is installed at the site following the removing and mounting steps.

6. The method of claim 1, further comprising using a retrofit kit for retrofitting the lighting fixture.

7. The method of claim 6, wherein the retrofit kit comprises a connector for connecting lightguides to one another in an end-to-end configuration.

8. The method of claim 6, wherein the retrofit kit comprises:
   the one or more light emitting diodes;
   the power supply; and
   the lightguide.

9. The method of claim 8, wherein the retrofit kit further comprises a writing that comprises instructions for retrofitting the lighting fixture.

10. The method of claim 1, wherein the lightguide comprises a strip of optical material.

11. The method of claim 1, wherein a retrofit kit comprises the one or more light emitting diodes, the power supply, and the lightguide.

12. A method for retrofitting a lighting fixture, comprising the steps of:
    removing a fluorescent tube from the lighting fixture; and
    mounting a power supply, one or more light emitting diodes, and a lightguide to the lighting fixture,
    wherein the mounted one or more light emitting diodes is oriented to couple light into an edge of the mounted lightguide,
    wherein the mounted lightguide is oriented to provide illumination by emitting the coupled light,
    wherein the mounted power supply is electrically coupled to the mounted one or more light emitting diodes,
    wherein mounting the lightguide to the lighting fixture comprises mounting a plurality of lightguides end-to-end between opposing ends of the lighting fixture, and
    wherein each lightguide comprises a strip of optical material.

13. The method of claim 12, further comprising using a retrofit kit for retrofitting the lighting fixture.

14. The method of claim 12, wherein a retrofit kit comprises the one or more light emitting diodes, the power supply, and the lightguide.

15. The method of claim 14, wherein the retrofit kit further comprises a writing that comprises instructions for retrofitting the lighting fixture.

16. The method of claim 12, wherein mounting the plurality of lightguides end-to-end between opposing ends of the lighting fixture comprises connecting the plurality of lightguides end-to-end using one or more connectors.

17. A method for retrofitting a lighting fixture, comprising the steps of:
removing a fluorescent tube from the lighting fixture; and
mounting a power supply, one or more light emitting diodes, and a lightguide to the lighting fixture,
wherein the mounted one or more light emitting diodes is oriented to couple light into an edge of the mounted lightguide,
wherein the mounted lightguide is oriented to provide illumination by emitting the coupled light,
wherein the mounted power supply is electrically coupled to the mounted one or more light emitting diodes,
wherein prior to the removing step, a ballast is attached to the lighting fixture in a location,
wherein the lighting fixture comprises wiring that is connected to the ballast,
wherein the method further comprises the step of cutting the wiring,
wherein during the removing step, the ballast is attached to the lighting fixture in the location, and
wherein the retrofitted lighting fixture comprises the ballast attached to the lighting fixture in the location.

18. The method of claim 17, wherein a retrofit kit comprises the one or more light emitting diodes, the power supply, and the lightguide.

19. The method of claim 18, wherein the retrofit kit further comprises a writing that comprises instructions for retrofitting the lighting fixture.

20. The method of claim 17, wherein the lightguide comprises a strip of optical material.

\* \* \* \* \*